United States Patent [19]

Devlin

[11] 4,066,300
[45] Jan. 3, 1978

[54] DIGITAL TRACTION CONTROL SYSTEM

[75] Inventor: Thomas A. Devlin, Royal Oak, Mich.

[73] Assignee: Aspro, Inc., Westport, Conn.

[21] Appl. No.: 737,058

[22] Filed: Oct. 29, 1976

[51] Int. Cl.$^2$ .............................................. B60T 8/10
[52] U.S. Cl. ..................................... 303/96; 324/161; 361/238; 364/426
[58] Field of Search ......................... 303/96, 109, 106; 235/150.2; 180/82 D; 361/236, 238; 324/161

[56]  References Cited
U.S. PATENT DOCUMENTS 3,706,351  12/1972  Neisch .................................... 303/96

Primary Examiner—Trygve M. Blix
Assistant Examiner—Reinhard J. Eisenzopf
Attorney, Agent, or Firm—Lawrence E. Laubscher

[57] ABSTRACT

A digital traction control system is disclosed for a motor vehicle having a plurality of driven wheels connected by a differential mechanism, characterized by the provision of a plurality of counters for counting pulses produced in accordance with the rotational velocities of the driven wheels, respectively, the counters being resettable when the count totals therein are within a given ratio. In the event that a driven wheel experiences a spin condition causing it to rotate at a higher rotational velocity than the other wheels, whereby the pulse count total of its associated counter exceeds the count total of the other counters outside the given ratio, a solenoid-operated brake is automatically activated to brake the faster wheel, thereby to transfer driving torque to the other driven wheel or wheels.

9 Claims, 3 Drawing Figures

DIGITAL TRACTION CONTROL SYSTEM

BRIEF DESCRIPTION OF THE PRIOR ART

Speed-responsive traction control systems for automatically braking an overrunning driven wheel upon the occurrence of a spinout condition are well known in the patented prior art, as evidenced by the patents to Eger et al U.S. Pat. Nos. 3,025,722, Mikina 3,253,672, Shepherd 3,169,595 and 3,288,232 and Eddy 3,981,545, the proprietary rights to each of which are held by the assignee of the present invention.

In these known systems, it is conventional to compare analog signals generated by velocity-sensing means associated with each driven wheel, respectively, and to operate the brake means associated with a faster running wheel upon the occurrence of a spin-out condition thereof, thereby to transfer torque to the remaining driven wheels. The prior traction control systems normally require a large number of pulses per wheel revolution (on the order of 60 to 120, for example) to maintain proper operation. The known systems for achieving the relatively high pulse rate are rather expensive to manufacture and difficult to install, and consequently the present invention was developed to avoid the above and other drawbacks of the known devices.

SUMMARY OF THE INVENTION

The present invention was developed to provide a digital traction control system which requires a much lower pulse rate (for example, on the order of 4 pulses per revolution) to effect proper braking operation of an overrunning driven wheel upon the occurrence of a spin-out condition thereof. This low pulse rate can be achieved, in accordance with the present invention, by mounting individual permanent magnets at four circumferentially spaced locations on the rim of the wheel and detecting these magnets by means of relatively inexpensive magnetic switches or pick-up coils.

Accordingly, a primary object of the present invention is to provide a digital traction control system for a motor vehicle having a plurality of driven wheels connected by a differential mechanism, said system including a plurality of counters associated with the driven wheels, respectively, each counter having an input terminal to which the pulses from the associated wheel are applied, means for resetting the counters when the totals contained therein are within a given ratio, and means operable when the count of one counter exceeds that of another by an amount greater than the aforementioned ratio for operating the brake solenoid associated with the faster running wheel. Use is made of a logic circuit including AND and NOR gates connected between the output terminals of the counters and the input terminals of the counter reset means, whereby the system operates solely on binary signals produced from the pulses generated by the magnet sensing means.

In accordance with a more specific object of the invention, timing means are provided which are operable — when the count of one counter exceeds the counts contained in the other counters by a value greater than the predetermined ratio — to change the brake operating solenoids from a disabled condition to an enabled condition for a predetermined period of time. More particularly, a timing relay is provided that is operated by push button switch means upon the occurrence of a spin-out condition of one or more wheels, which relay becomes energized to close relay contacts that connect with the power source the power circuit electrodes of solenoid transistors which are connected in series with the brake solenoids, respectively.

In accordance with a further object of the invention, a spin lamp is provided that is energized by the logic circuit when the count of one counter exceeds the counts of the other counters by a predetermined ratio, and a traction lamp is provided which is energized when the solenoid transistors are in the enabled condition.

BRIEF DESCRIPTION OF THE DRAWING

Other objects and advantages of the invention will become apparent from a study of the following specification, when viewed in the light of the accompanying drawing, in which.

DETAILED DESCRIPTION

Figures 1A, 1C:
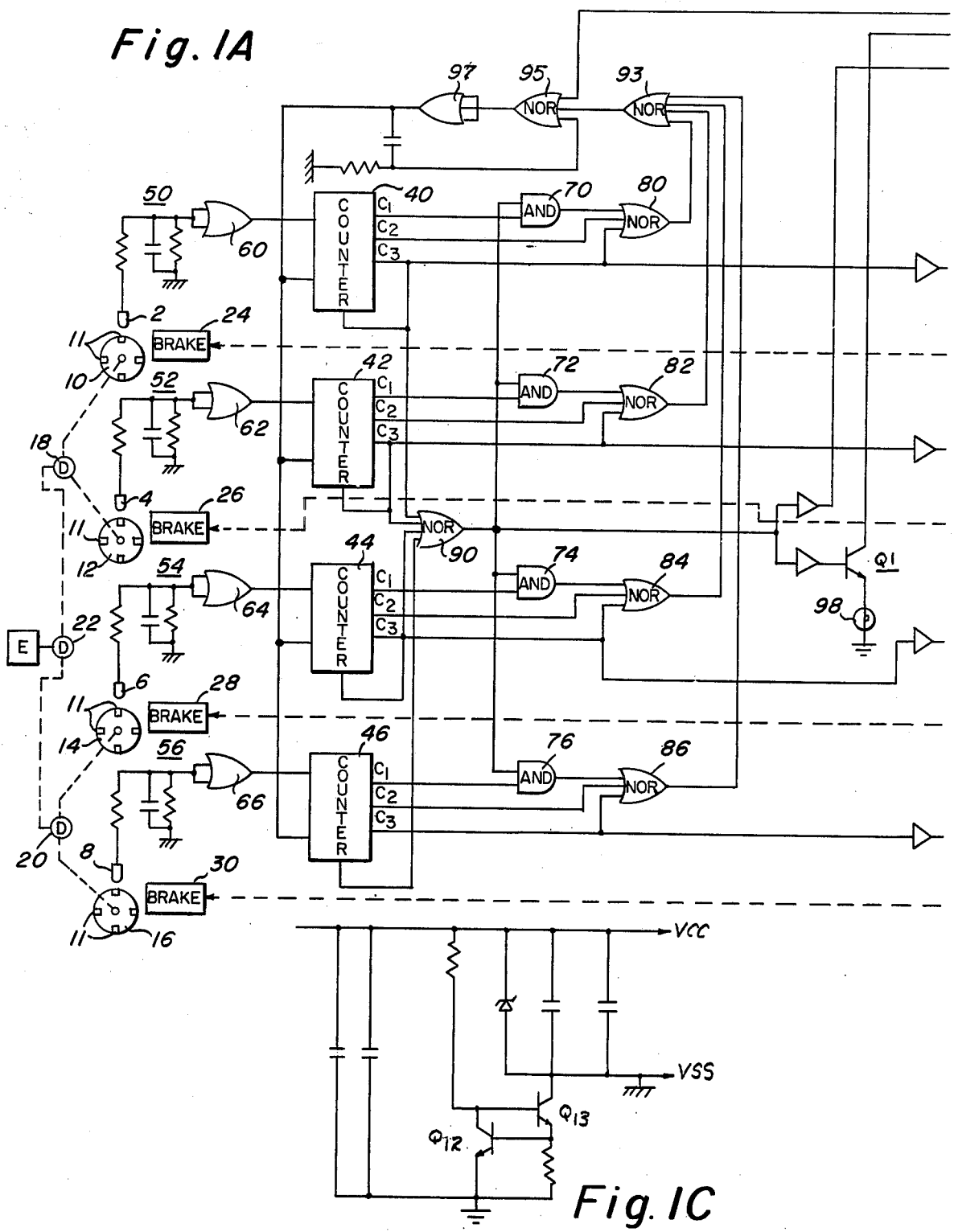
FIGS. 1A, 1B and 1C form a schematic electrical diagram of the digital traction control system for motor vehicles.
Figure 1B:
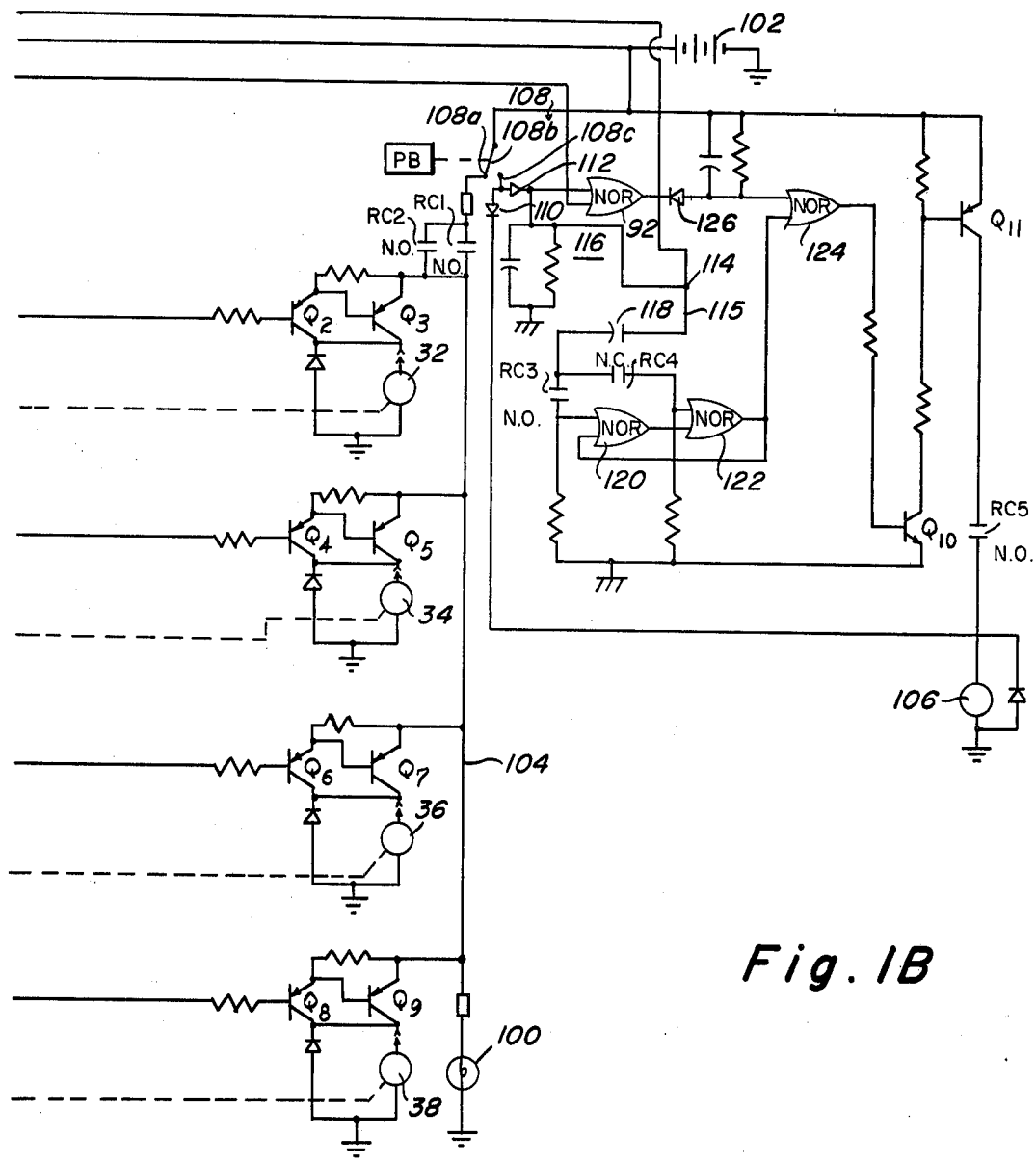

Referring now to the drawing, the electrical system of the present invention includes a plurality of magnetic pick-up heads 2, 4, 6 and 8 associated with the driven wheels 10, 12, 14 and 16 of the vehicle. The driven wheels 10 and 12 are coaxially arranged and are connected by a conventional differential mechanism 18, and driven wheels 14 and 16 are coaxially arranged and are connected by the differential mechanism 20, which differential mechanisms are driven by the engine E via mechanism 22, as is conventional in the art. The wheels are provided with conventional brake means 24, 26, 28 and 30 operable by normally de-energized brake solenoids 32, 34, 36 and 38, respectively. Furthermore, each wheel is provided with four equally spaced magnets 11.

The pick-up heads are connected with the input terminals of counters 40, 42, 44 and 46 via resistance-capacitance filter circuits 50, 52, 54 and 56 and integrated inverter and pulse shaper means 60, 62, 64 and 66, respectively. The counters each have three output terminals, the first output terminals $C_1$ being connected with one input of the AND gates 70, 72, 74 and 76, respectively, the second output terminals $C_2$ being connected with one input terminal of the NOR gates 80, 82, 84 and 86, respectively, and the third output terminals $C_3$ being connected with the base electrodes of transistors $Q_2$, $Q_4$, $Q_6$ and $Q_8$, respectively. The third output terminals $C_3$ of the counters are also connected with the input terminals of the NOR gates 80, 82, 84 and 86, respectively, and with the input terminals of NOR gate 90 the output terminal of which is connected with another input of AND gates 70, 72, 74 and 76, respectively, and also with the control electrode of spin transistor $Q_1$, and with one input terminal of NOR gate 92. The output terminals of AND gates 70, 72, 74 and 76 are connected with further input terminals of NOR gates 80, 82, 84 and 86 respectively, and the output terminals of NOR gates 80, 82, 84 and 86 are connected with the input terminals of NOR gate 93. The output terminal of NOR gate 93 is connected with one input of NOR gate 95 the output terminal of which is connected with reset timer 97 having an output terminal connected with the reset terminals of counters 40, 42, 44 and 46.

The emitters of transistors $Q_2$, $Q_4$, $Q_6$ and $Q_8$ are connected with the base electrodes of transistors $Q_3$, $Q_5$, $Q_7$ and $Q_9$, respectively, the power circuit electrodes of which are connected in series with the brake solenoids 32, 34, 36 and 38, respectively. The power circuit electrodes of spin transistor Q1 are connected in series with the "spin" lamp 98, and "traction" light 100 is connected with the positive terminal of D. C. voltage source 102 via conductor 104, normally open contacts RC1 of relay 106, and the normally closed stationary contact 108a and movable contact 108b of push button switch 108. The emitter of transistor Q3 is also connected with stationary switch contact 108a via normally open relay contacts RC2 of relay 106. The emitter electrodes of transistors Q3, Q5, Q7 and Q9 are connected with conductor 104, whereby the series branches including the power electrode circuits of these transistors and the brake solenoids 32, 34, 36 and 38 are connected in parallel with the "traction" lamp 100. The normally open stationary push button switch contact 108c is connected with the coil of relay 106 via diode 110, and also, via diode 112, with the other input of NOR circuit 92, and with the junction 114 of conductor 115 via resistance-capacitance circuit 116. One terminal of timing capacitor 118 is connected with another input to NOR gate 95 via conductor 115 and junction 114, and the other terminal is connected with one input terminal of each of the NOR circuits 120 and 122 via normally open relay contacts RC3 and normally closed relay contacts RC4, respectively. The output terminal of NOR circuit 120 defines the other input to NOR circuit 122, and the output terminal of NOR circuit 122 defines the second input to NOR circuit 120.

The output terminal of NOR circuit 92 is connected with one input of NOR circuit 124 via diode 126, and the output of NOR circuit 122 is connected with the other input of NOR circuit 124 via diode 126. The output of NOR circuit 124 is connected with the base electrode of transistor Q10 the collector of which is connected with the base electrode of transistor Q11. The power circuit electrodes of transistor Q11 are connected in series with the coil of relay 106 via normally open relay contacts RC5. Finally, the base and collector electrodes of transistor Q12 are connected with the emitter and base electrodes, respectively, of transistor Q13, which transistors are connected in the power supply circuit for supplying positive and negative potentials VCC and VSS to the integrated circuits.

OPERATION

Owing to the provision of four magnets 11 on each of the wheels, the system of the present invention requires a much lower pulse per wheel revolution rate (in this case, four) to operate properly than required by the prior systems. Experience has shown that for best operation, two differential wheel speed ratios are required, a large ratio (in this case, a 4:1 ratio) to activate the system, and a smaller ratio (namely, 2:1) to disable the system. Of course, these ratios could be varied, as desired, by appropriate changes in the circuitry.

Assuming first that the motor vehicle is operated in the normal driving condition, positive going wheel pulses from the pick-up heads 2, 4, 6 and 8 are filtered by the filtering circuits 50, 52, 54, and 56, inverted and shaped by the circuits 60, 62, 64 and 66, and are counted by the counters 40, 42, 44 and 46. The count in each counter is available in binary form on counter outputs C1, C2 and C3. As long as no counter achieves a count of four, all counter outputs are low, whereby the output of NOR gate 90 is high, so that the counter C1 outputs pass through the AND gates 70, 72, 74 and 76 to one input of the NOR gates 80, 82, 84 and 86. Consequently, a count of 1, 2, 3 or 4 is able to force the output of each NOR gate to a low condition. When all four NOR outputs are low, the output of NOR gate 93 goes high, whereupon reset timer 97 resets all of the counters to zero for repeating the counting cycle. This cycle will repeat as long as the ratio of the fastest wheel to the slowest wheel is less than 4:1.

Assume now that wheel 10 obtains a spinning condition relative to the other wheels (as might occur, for example, when wheel 10 is on a patch of ice). Consequently, the C3 output of counter 40 goes high, thereby holding the count of four until the counter is reset. Spin transistor Q1 is rendered operable by the signal supplied via NOR circuit 90, thereby energizing the "spin" lamp 98. A signal is also applied to one input of the gate 92. The vehicle operator then operates push button switch 108 to activate the timing circuit for a given time interval (for example, 15 seconds). A positive potential is applied to relay 106 via movable switch contact 108b, stationary contact 108c, and diode 110, whereupon relay contacts RC1, RC2, RC3 and RC5 are closed, and relay contact RC4 is opened. Upon release of the push button, "traction" lamp 100 is energized and transistors Q2-Q9 are enabled. Since the output of NOR gate 90 is low, owing to the signal supplied from the output terminal C3 from counter 40, transistors Q2 and Q3 operate to energize solenoid 32 and thereby operate the brake 24, whereupon the spinning wheel 10 is braked, and torque is transmitted from the engine E to the remaining wheels via the differential mechanisms 22, 18 and 20. Since the AND gates 72, 74 and 76 are no longer able to transfer the C1 outputs of counters 42, 44 and 46, a count of one will not be recognized, and the wheels will be forced to make at least a one-fourth revolution (i.e., two counts) before the circuit can disable. When all wheels have generated at least two counts, the system will reset and the cycle is started over. At the end of the fifteen second timing cycle after the spin condition is corrected, as determined by timing capacitor 118, transistors Q10 and Q11 are returned to their initial condition, and relay 106 is de-energized whereupon relay contacts RC1, RC2, RC3 and RC5 are opened, relay contacts RC4 are closed, the transistors Q2–Q9 are disabled, and all the brake solenoids and traction lamp 100 are de-energized.

It is apparent that during the time that any of the brake solenoids is in an energized condition, it may be de-energized by the operator to release the accompanying wheel brake means by merely depressing the push button of switch 108 to disable the transistors Q2–Q9 and to reset the timer.

Owing to the provision of the timer relay 106 and the push button switch 108, accidental application of the wheel brakes by a defect in the system is eliminated.

The illustrated circuit can be used with from two to four driven wheels by paralleling the inputs, as needed. The basic system can, of course, be simplified for a two wheel system or be expanded to any number of wheels.

It is apparent that if both wheels of a wheel pair having a common axle (such as the wheels 10 and 12) were to be in a spin condition, these wheels would be simultaneously braked to transfer drive torque from the engine to the remaining wheels.

The present invention makes use of conventional integrated circuit components as follows:

| | |
|---|---|
| AND gates 70, 72, 74, 76 | CD 4081 |
| NOR gates 80, 82, 84, 86 | CD 4025 |
| NOR gates 90, 93 | CD 4002 |

| -continued | |
|---|---|
| Inverter and shaper 60, 62, 64, 66 | CD 4001 |
| NOR gate 95 and reset circuit 97 | CD 4025 |
| Counters 40, 42, 44, 46 | 4518 |
| NOR gates 92, 120, 122, 124 | CD 4001 |

While in accordance with the provisions of the Patent Statutes the preferred form and embodiments of the invention have been illustrated and described, it will be apparent to those skilled in the art that changes and modifications may be made without deviating from the inventive concepts set forth above.

What is claimed is:

1. A digital anti-spin brake control system for a motor vehicle having at least two driven wheels connected by a differential mechanism, comprising
   a. a plurality of pulse generating means (11; 2, 4, 6, 8) for generating pulses in accordance with the rotational velocity of each of the driven wheels, respectively;
   b. a plurality of normally de-energized solenoid-operated brake means (24, 26, 28 and 30) associated with said driven wheels, respectively;
   c. a plurality of counters (40, 42, 44 and 46) for counting the pulses generated by the pulse generating means associated with each wheel, respectively, each of said counters including at least three output terminals (C1, C2, C3);
   d. means (97) for resetting all of the counters when said counters contain count totals which fall within a predetermined ratio, said counter reset means including
      1. a plurality of two-input AND gates (70, 72, 74, 76) associated with said counters, respectively, each of said AND gates having a first input connected with a first output terminal (C1) of the associated counter;
      2. a plurality of first NOR gates (80, 82, 84, 86) associated with said counters, respectively, each of said NOR gates having a first input connected with the output of the associated AND gate, and second and third inputs connected with the second and third output terminals of the associated counter, respectively;
      3. a second NOR gate (90) having a plurality of inputs connected with the third output terminals of said counters, respectively, the output of said second NOR gate being connected with the other inputs of each of said AND gates; and
      4. a third NOR gate (93) the input terminals of which are connected with the output terminals of said first NOR gates, respectively, the output terminal of said third NOR gate being connected with said counter reset means; and
   e. means operable when the count total of at least one of the counters exceeds the total of another counter by a value greater than said predetermined ratio for operating the brake means associated with the wheel which corresponds with the said one counter.

2. Apparatus as defined in claim 1, wherein the third output terminals of the counters are also connected with the brake operating solenoids (32, 34, 36, 38) of the wheel brake means of the associated wheels, respectively.

3. Apparatus as defined in claim 2, wherein said wheel brake operating solenoids are normally in a disabled condition, and means (108, 106, RC1) for enabling said brake operating solenoids for a given period of time.

4. Apparatus as defined in claim 3, and further including a plurality of solenoid transistors (Q3, Q5, Q7, Q9) having power electrode circuits connected in series with said brake operating solenoids, respectively, to define series branches; and further wherein said enabling means includes a push button switch (108) operable from a normal first condition to a second condition, a normally de-activated timing relay (106), a voltage source (102), means (110) for activating said timing relay when said switch is in its second condition, and first contact means (RC1) operable by said relay to connect said series branches in parallel across said voltage source, thereby to enable said solenoids.

5. Apparatus as defined in claim 4, wherein said solenoid transistors include control electrodes, and further including means (Q2, Q4, Q6, Q8) connecting the control electrodes of said solenoid transistors with the third output terminals of the counters, respectively.

6. Apparatus as defined in claim 5, and further including timing circuit means including relay contact means (RC5) for maintaining the timing relay energized for a predetermined period of time.

7. Apparatus as defined in claim 4, and further including a traction indicating lamp (100) connected in parallel with said series branches.

8. Apparatus as defined in claim 1, and further including a normally de-energized spin indicating lamp (98) connected with the output of said second NOR gate, and means including a spin transistor for energizing said indicating lamp when said second NOR gate is operable to supply signals to said other inputs of said AND gates.

9. Apparatus as defined in claim 4, wherein said means for activating said timing relay includes a fourth NOR gate (92) having a pair of inputs one of which is connected with said voltage source when said push button switch is in its second condition, and means connecting the other input of said fourth NOR gate with the output of the second NOR gate (90).

* * * * *